(12) United States Patent
Muñoz Kirschberg et al.

(10) Patent No.: US 10,135,743 B2
(45) Date of Patent: Nov. 20, 2018

(54) CONFIDENCE DEGREE OF DATA PACKET FLOW CLASSIFICATION

(71) Applicant: Telefonaktiebolaget L M Ericsson (Publ), Stockholm (SE)

(72) Inventors: Javier Muñoz Kirschberg, Madrid (ES); Ibon Gochi Garcia, Algorta (ES)

(73) Assignee: Telefonaktiebolaget LM Ericsson (Publ) (SE)

( * ) Notice: Subject to any disclaimer, the term of this patent is extended or adjusted under 35 U.S.C. 154(b) by 121 days.

(21) Appl. No.: 14/905,620

(22) PCT Filed: Jul. 31, 2013

(86) PCT No.: PCT/EP2013/066073
§ 371 (c)(1),
(2) Date: Jan. 15, 2016

(87) PCT Pub. No.: WO2015/014396
PCT Pub. Date: Feb. 5, 2015

(65) Prior Publication Data
US 2016/0173390 A1  Jun. 16, 2016

(51) Int. Cl.
*H04L 12/46* (2006.01)
*H04L 12/851* (2013.01)
*H04L 12/813* (2013.01)

(52) U.S. Cl.
CPC ........ *H04L 47/2441* (2013.01); *H04L 47/20* (2013.01); *H04L 47/2483* (2013.01); *H04L 47/24* (2013.01)

(58) Field of Classification Search
CPC ..... H04L 47/10; H04L 47/2441; H04L 47/29; H04L 47/32; H04L 47/20
See application file for complete search history.

(56) References Cited

U.S. PATENT DOCUMENTS

| | | | |
|---|---|---|---|
| 9,015,318 B1* | 4/2015 | Batz | H04L 61/1511 709/217 |
| 2003/0235209 A1* | 12/2003 | Garg | H04L 12/4675 370/468 |
| 2006/0015563 A1 | 1/2006 | Judge et al. | |
| 2007/0070895 A1* | 3/2007 | Narvaez | H04L 47/10 370/230 |
| 2007/0280245 A1* | 12/2007 | Rosberg | H04L 47/10 370/392 |

(Continued)

FOREIGN PATENT DOCUMENTS

EP  2584496 A1  4/2013

OTHER PUBLICATIONS

3GPP TS 23.203 V12.1.0 (Jun. 2013), 3rd Generation Partnership Project; Technical Specification Group Services and System Aspects; Policy and Charging Control Architecture (Release 12), Jun. 24, 2013, consisting of 189 pages.

(Continued)

*Primary Examiner* — Sai Aung
(74) *Attorney, Agent, or Firm* — Christopher & Weisberg, P.A.

(57) ABSTRACT

At least one identifier classifies a data packet flow of data packets between an originator and the recipient. A confidence level value of the at least one identifier specifies a confidence degree with which the at least one identifier is determined.

36 Claims, 10 Drawing Sheets

(56) References Cited

U.S. PATENT DOCUMENTS

| | | | |
|---|---|---|---|
| 2010/0228625 A1* | 9/2010 | Priyadarshan | G06Q 30/02 705/14.49 |
| 2011/0040706 A1 | 2/2011 | Sen et al. | |
| 2011/0058523 A1* | 3/2011 | Manning | H04W 28/16 370/329 |
| 2012/0033581 A1* | 2/2012 | Torres Ramon | H04L 12/14 370/253 |

OTHER PUBLICATIONS

3GPP TS 29.212 V12.1.0 (Jun. 2013), 3rd Generation Partnership Project; Technical Specification Group Core Network and Terminals; Policy and Charging Control (PCC); Reference points (Release 12), Jun. 27, 2013, consisting of 200 pages.

3GPP TS 29.213 V12.0.0 (Jun. 2013), 3rd Generation Partnership Project; Technical Specification Group Core Network and Terminals; Policy and Charging Control signalling flows and Quality of Service (QoS) parameter mapping (Release 12), Jun. 27, 2013, consisting of 196 pages.

3GPP TS 32.240 V12.1.0 (Jun. 2013), 3rd Generation Partnership Project; Technical Specification Group Services and System Aspects; Telecommunication management; Charging management, Charging architecture and principles (Release 12), Jun. 27, 2013, consisting of 47 pages.

International Search Report and Written Opinion dated Mar. 27, 2014 for International Application No. PCT/SEP2013/066073, International Filing Date Jul. 31, 2013 consisting of 12 pages.

* cited by examiner

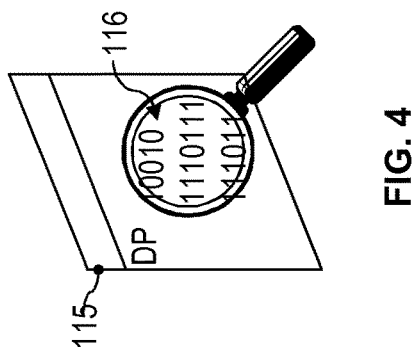
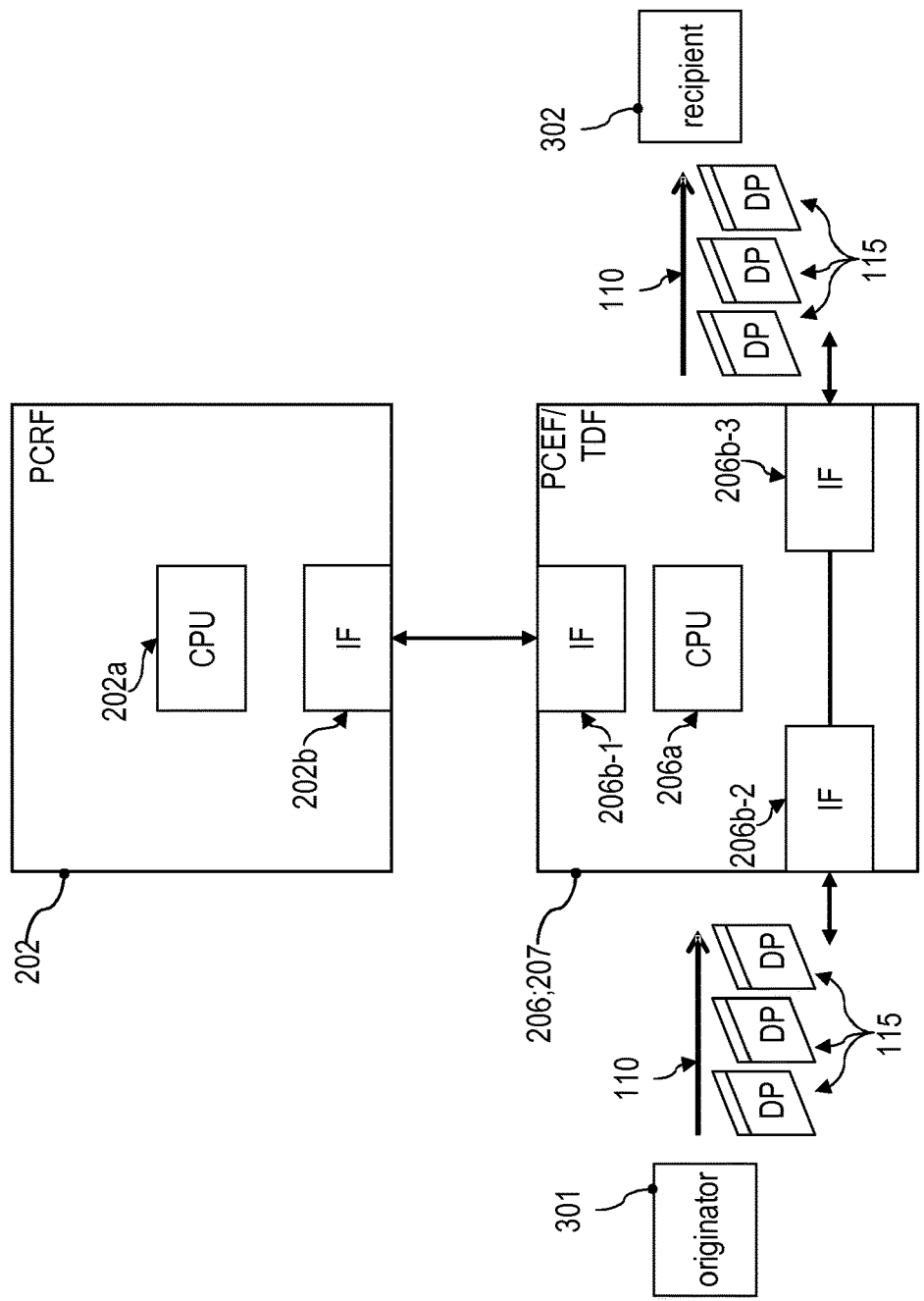

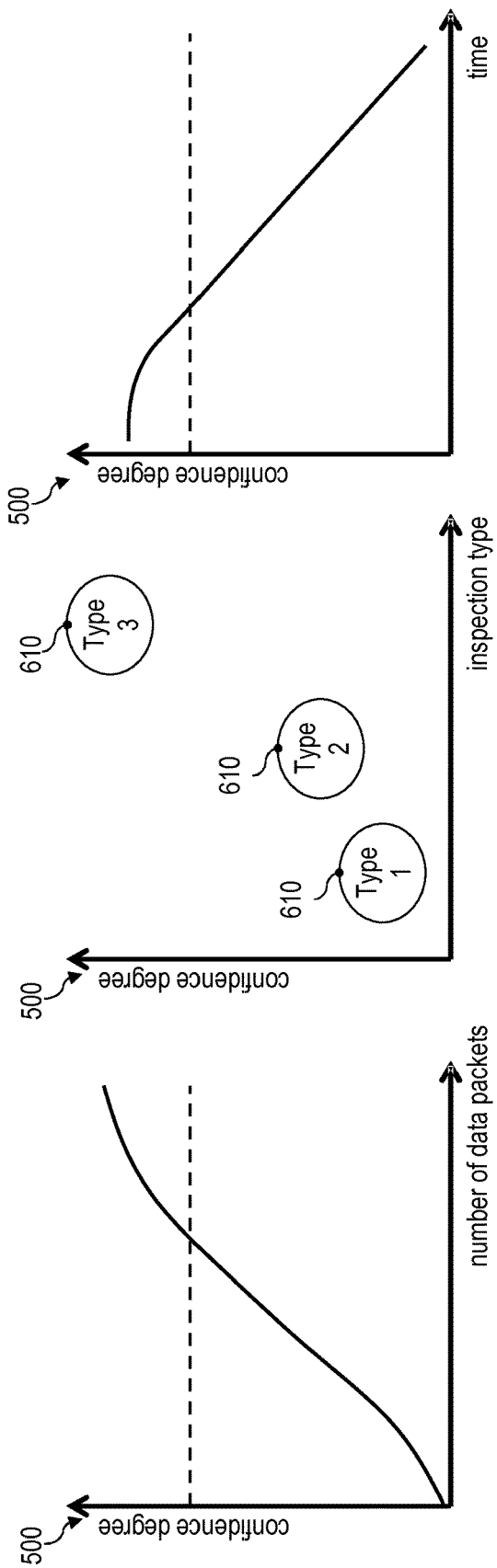

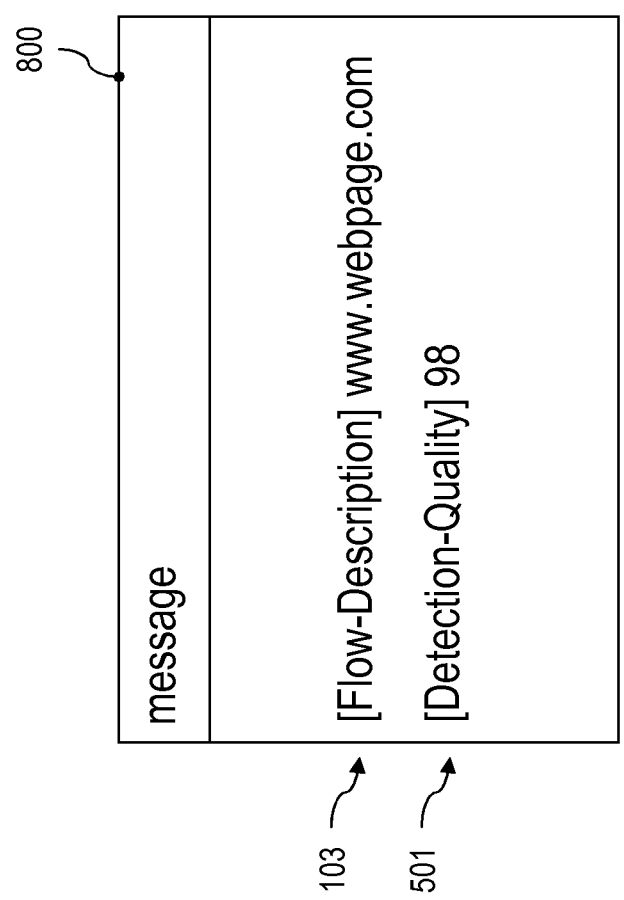

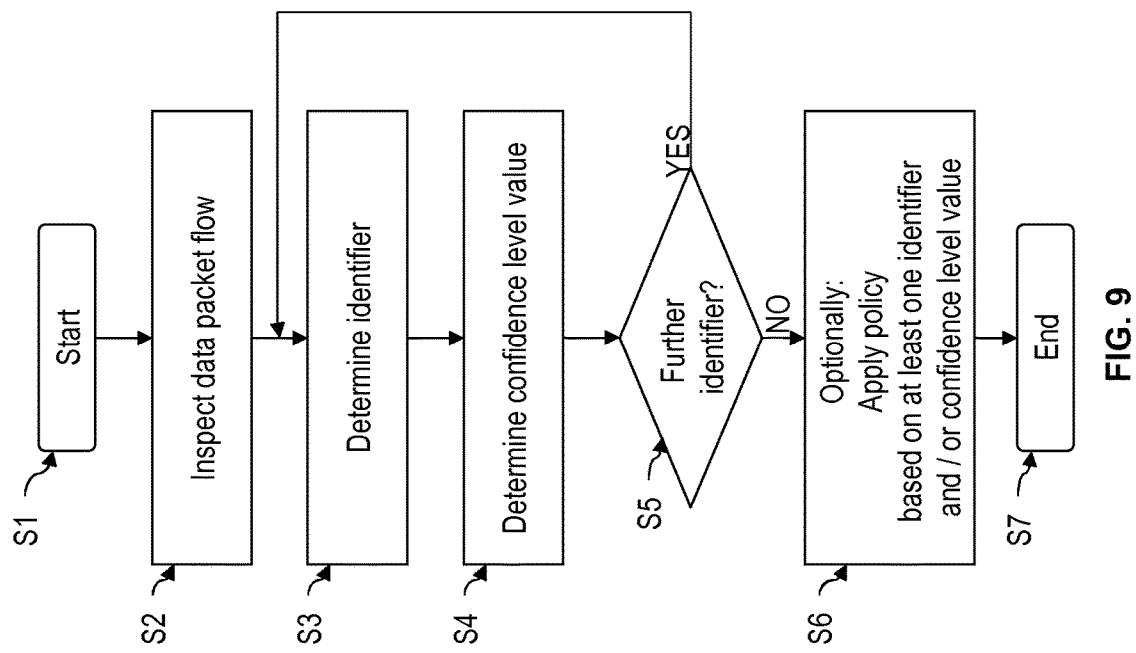

CONFIDENCE DEGREE OF DATA PACKET FLOW CLASSIFICATION

TECHNICAL FIELD

The present invention relates to techniques of classification of a data packet flow taking into account a confidence degree with which the data packet flow is classified.

BACKGROUND

In communication networks, data packet flows comprising data packets can be employed for the transmission of data between an originator and a recipient. The transmission of data may relate to the sending and/or receiving of the data. Differentiated handling of various data packet flows may be used to distinguish between different classes of data traffic. The different classes of data traffic may be mapped by a certain classification of the data packet flow.

Based on the classification of the data packet flow, it is possible to keep track and monitor the exchange of data via data packet flows in the communications network. In dependence of the classification, it is also possible to apply a policy to the data packet flow which relates to, e.g., charging and/or forwarding rules. This allows to tailor the transmission of a particular data packet flow by applying of a policy. For example, a forwarding treatment of data packets of the data packet flow, i.e., the manner of forwarding a data packet on the way towards the recipient, may be controlled to provide a certain Quality of Service (QoS) level which depends on the classification of the data packet flow.

It is possible that the communications network is configured according to the Third Generation Partnership Project (3GPP) architecture. In such a scenario, the above-mentioned techniques of differentiated handling of data packet flows are inter-alia known in the context of the so-called Policy and Charging Control (PCC) architecture according to the 3GPP Technical Specification (TS) 23.203.

However, such techniques as mentioned above may face certain restrictions. For example, the classification of the data packet flow may be subject to errors and uncertainties. For example, a data packet flow may be falsely classified. As a result, a certain policy may be inadvertently applied to the data packet flow in dependence of the falsely classified data packet flow. This may degrade operation reliability of the communications network.

Therefore, a need exists to provide advanced techniques of classifying of a data packet flow. In particular, a need exists for such techniques which are more reliable.

SUMMARY

This need is met by the features of the independent claims. The dependent claims define embodiments.

According to an aspect, a method of classifying a data packet flow between an originator and a recipient in a communications network is provided. The method comprises inspecting at least one data packet of the data packet flow to yield a characteristic property of the data packet flow. The method further comprises determining at least one identifier for the data packet flow based on the characteristic property. The at least one identifier classifies the data packet flow. The method further comprises determining a confidence level value of the at least one identifier. The confidence level value specifies a confidence degree with which the at least one identifier is determined.

According to a further aspect, a method of applying a policy to a data packet flow between an originator and a recipient in a communications network is provided. The method comprises receiving at least one identifier for the data packet flow which classifies the data packet flow. The method further comprises receiving a confidence level value of the at least one identifier. The confidence level value specifies a confidence degree with which the at least one identifier is determined. The method further comprises applying a policy to the data packet flow, at least based on the confidence level value.

According to a further aspect, a network entity which is configured to classify a data packet flow between an originator and a recipient in a communications network is provided. The network entity comprises an interface which is configured to receive at least one data packet of a data packet flow. The network entity comprises a processor which is configured to inspect the at least one data packet to yield a characteristic property of the data packet flow. The processor is further configured to determine at least one identifier for the data packet flow based on the characteristic property. The at least one identifier classifies the data packet flow. The processor is further configured to determine a confidence level value of the at least one identifier. The confidence level value specifies a confidence degree with which the at least one identifier is determined.

According to a further aspect, a network entity which is configured to apply a policy to a data packet flow between an originator and a recipient in a communications network is provided. The network entity comprises an interface which is configured to receive at least one identifier for the data packet flow which classifies the data packet flow. The interface is further configured to receive a confidence level value of the at least one identifier. The confidence level value specifies a confidence degree with which the at least one identifier is determined. The network entity further comprises at least one processor which is configured to apply a policy to the data packet flow, at least based on the confidence level value.

According to further aspects, other methods, devices, or computer program products for implementing the methods may be provided.

BRIEF DESCRIPTION OF THE DRAWINGS

FIG. 3 schematically illustrates a Policy and Charging Rules Function and a Policy Control Enforcement Function, respectively a Traffic Detection Function, according to an embodiment of the invention.

FIG. 4 schematically illustrates Deep Packet Inspection of a data packet of the data packet flow.

FIG. 5 illustrates a dependency of a confidence degree on a number of data packets which are inspected according to an embodiment of the invention.

FIG. 6 illustrates a dependency of the confidence degree on an inspection type with which the data packets are inspected according to an embodiment of the invention.

FIG. 7 illustrates a dependency of the confidence degree on time according to an embodiment of the invention.

FIG. 8 illustrates a message which includes, according to an embodiment of the invention, an identifier which classifies the data packet flow and a confidence level value indicating the confidence degree with which the identifier is determined.

FIG. 9 is a flowchart of a method according to various embodiments.

DETAILED DESCRIPTION OF EMBODIMENTS

Figure 1:
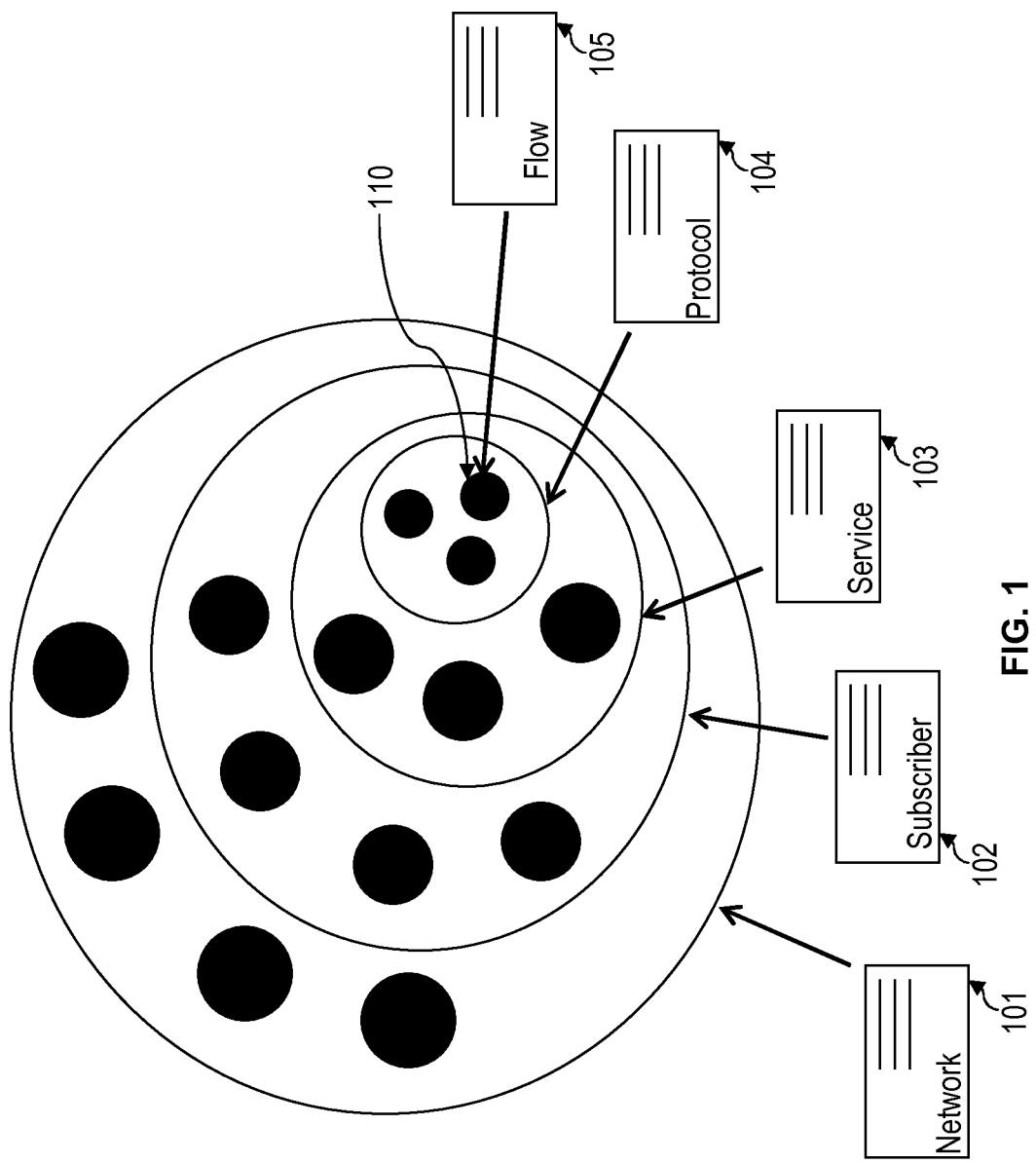
FIG. 1 illustrates levels of hierarchy of a classification of a data packet flow according to an embodiment of the invention.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are described which relate to the classification of data packet flows in a communications network. The data packet flow relates to the transmission of data packets between an originator and a sender. In general, the data packet flow can be bi-directional. It is also possible to treat each direction of a bi-directional data exchange as a separate data packet flow.

In particular, hereinafter techniques are described where in addition to a classification of the data packet flow by means of an identifier a confidence level value is provided which specifies a confidence degree with which the identifier is determined. For example, a large (small) confidence degree may relate to small (large) error margins of the identifier, the error margins indicating a trustworthiness of the identifier. For example, a large (small) confidence degree may relate to a small (large) likelihood that the identifier is falsely determined. The confidence level value may describe the confidence degree implicitly or explicitly, e.g., according to certain predefined rules and/or at a given resolution. For example, the confidence value can be an 8-bit integer, where the value 255 (0) corresponds to a minimum (maximum) confidence degree. For example, the minimum (maximum) confidence degree can relate to 0% (100%) trustworthiness of the identifier. Of course, various scenarios are conceivable for the defining of the confidence level value in dependence of the confidence degree. All such scenarios are embraced by the present invention.

For the purpose of the classification, the data packet flow can be inspected. The classification of the data packet flow can be established at various levels of detail. In particular, a hierarchical structure can be adopted in the classification. This is schematically illustrated in FIG. 1. In FIG. 1, a certain data packet flow 110 is shown. The data packet flow 110 can be classified by determining respective identifiers 101-105 for the data packet flow 110.

For example, the lowest level of hierarchy in the classification is typically specified by the flow identifier 105. A given flow identifier 105 is assigned to all data packets of a given data packet flow, e.g. a connection between a certain originator and receiver or to a connectionless transport session. A connectionless transport session may be implemented using the Transmission Control Protocol (TCP) or the User Datagram Protocol (UDP), etc.

The next level up in hierarchy can be specified by the protocol identifier 104. For example, if the mapping between services, i.e., data packet flows generated or used by a particular application, and protocols is not one-to-one, several services may use the same protocol and data packet flows can be classified according to the protocol identified by the protocol identifier 104 across various services.

The service identifier 103 specifies the service as mentioned above. In other words, the service identifier 103 classifies a service or application for which a content of data packets of the data packet flow 110 comprise data. E.g., the content may be part of the payload of the data packets.

The subscriber identifier 102 specifies the particular subscriber of the data packet flow, i.e., a user associated with the originator and/or the recipient. The network identifier 101 identifies the particular communications network associated with the data packet flow.

All these identifiers 101-105 together classify the data packet flow 110. It is possible that some or all of the above-mentioned identifiers 101-105 change over time. In certain scenarios the subscriber identifier 102 of a particular data packet flow remains constant, however, e.g., the service identifier 103 may change over the course of time for the data packet flow 110. One example would be that in a data packet flow 110 which carries Hypertext Transfer Protocol (HTTP) traffic from a website, every HTTP request results in the data packet 110 being classified using a different service identifier 103. For example, a first HTTP request can relate to a uniform resource locater (URL) to post messages, where a second HTTP request relates to a different URL to get news and alerts. As can be seen from the above, a frequency of the change over time can vary from identifier 101-105 to identifier 101-105 and for various data packet flows 110.

Different classification criterions and/or a different number of classification criterions may be used alternatively or additionally to those as described above with respect to FIG. 1. In general, various scenarios exist for the classification of the data packet flow 110. In general, this enables to keep track and monitor the exchange of data via data packet flows 110 in the communications network at a comparably high level of detail.

It is possible that the forwarding of the data packets of the classified data packet flow 110 depends on the classification of the data packet flow 110. Once at least one identifier 101-105 has been determined, it can be exported across the communications network. For example, it can be provided to a control entity, which decides, based on the identifier 101-105, which charging policies and/or Quality of Service (QoS) policies are applied.

Such techniques as mentioned above may be applied for various communications networks. In the following, the concepts will be explained in the context of a 3GPP mobile communications network. The mobile communications network may support one or more types of radio access technology (RAT), such as GSM (Global System for Mobile Communication), GSM EDGE (Enhanced Data Rates for GSM Evolution), UMTS (Universal Mobile Telecommunications System), and/or Evolved UMTS, also referred to as 3GPP LTE (Long Term Evolution). The mobile communications network may thus be equipped with one more corresponding types of radio access network, such as a GSM radio access network (GRAN), a GSM EDGE radio access network (GERAN), a UMTS radio access network (UTRAN), or an Evolved UTRAN (E-UTRAN). However, it is to be understood that the illustrated concepts may be applied in other types of communications network as well, e.g., other mobile communications networks using other types of RAT such as RATs based on Code Division Multiple Access (CDMA) and that particular types of nodes described in the following may vary in accordance with the type of implemented RATs. Further, the concepts may also applied in a Fixed Mobile Convergence (FMC) scenario, i.e., in a mobile network which also supports fixed access, e.g., using Digital Subscriber Line (DSL) or coaxial cable access technologies. The respective techniques may also be applied in fixed line communication networks.

Figure 2:
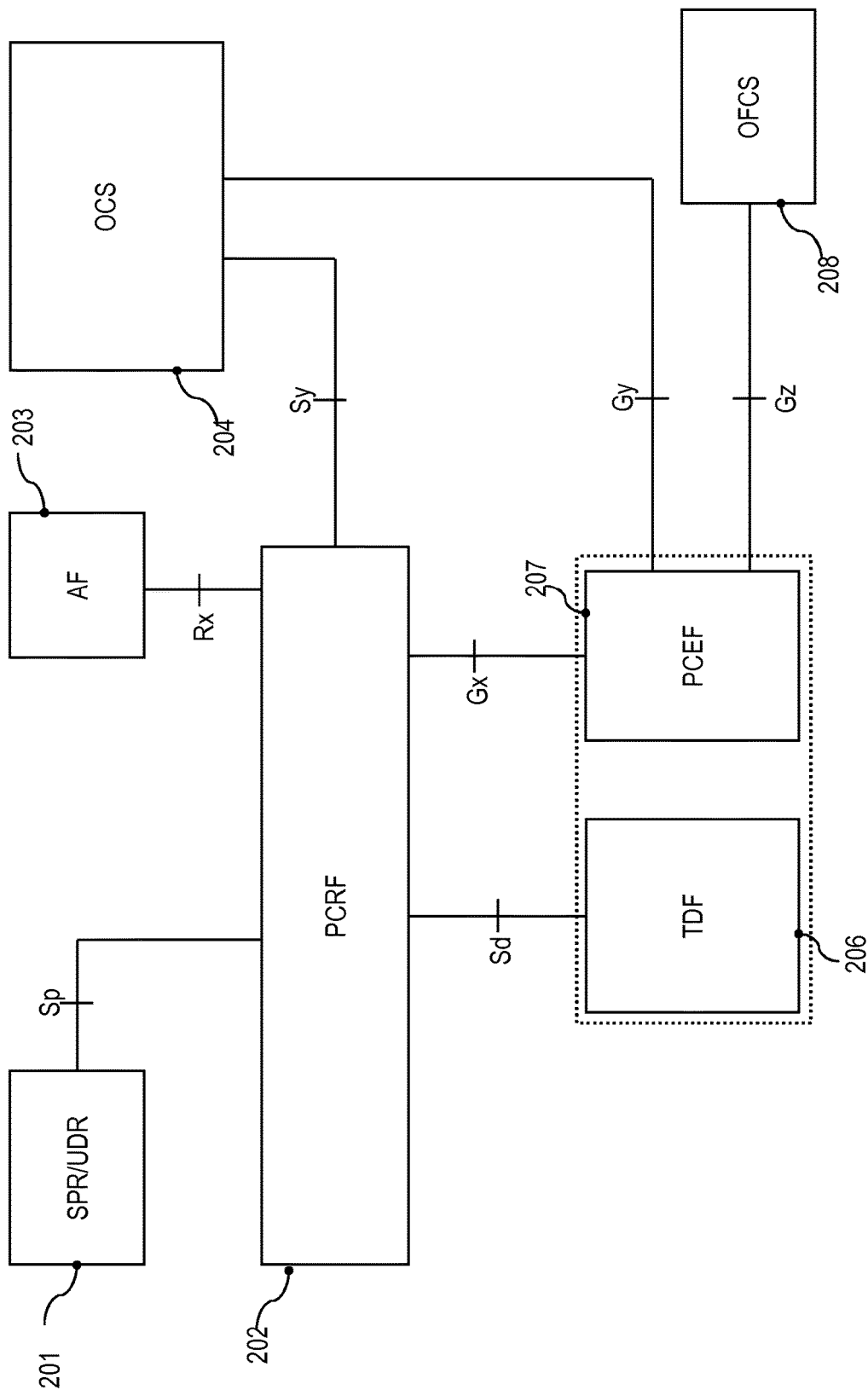
FIG. 2 schematically illustrates a PCC architecture of a communications network according to the 3GPP TSs in which concepts of classification of data packet flows according to various embodiments of the invention are implemented.

A particular architecture of a communications network which can implement such identifiers 101-105 is the PCC architecture according to the 3GPP TS 23.203, see in particular chapter 5. Such a PCC architecture is schematically illustrated in FIG. 2. The 3GPP TS 23.203 discloses the PCC architecture in a mobile communications system which comprises a Evolved 3GPP Packet Switched Domain (EPS) which allows, amongst others, to determine and subsequently enforce policies for data packet flows 110. The data packet flow 110 can be between the originator and the recipient (not shown in FIG. 2) and can therefore relate to services which involve a user terminal (UE) attached to the mobile communications network. For example, these policies can relate to charging and/or QoS and/or blocking of services and/or forwarding rules.

As illustrated in FIG. 2, the PCC architecture includes a policy controller 202, in the illustrated example implemented as a Policy and Charging Rules Function (PCRF), and a repository 201. In the illustrated example, the repository 201 is assumed to correspond to a Subscriber Profile Repository (SPR). However, it is to be understood that other types of repository could be used as well, e.g., a User Data Repository (UDR). Further, the PCC architecture also includes a Policy Control Enforcement Function (PCEF) 207. As illustrated, the PCC architecture may also include a Traffic Detection Function (TDF) 206, an Offline Charging System (OFCS) 208, an Online Charging System (OCS) 204, and an Application Function (AF) 203. In the example of FIG. 2, the functionality of the TDF 206 and the PCEF 207 is implemented in a single entity (illustrated by the dotted lines), but may also be implemented in separate entities.

The PCRF 202 is configured to perform policy control decision and flow based charging control. The PCRF 202 provides network control regarding detection of data packet flows 110, gating, Quality of Service (QoS), and data packet flow based charging towards the PCEF 207. For this purpose, the PCRF 202 may signal PCC rules to the PCEF 207 via the Gx interface. The PCEF 207 may be further configured to perform policy enforcement and flow based charging functionalities, which is typically accomplished by applying the PCC rules as signaled by the PCRF 202 via Gx.

The PCEF 207 may be configured to perform inspection of the data packet flow 110, such as Deep Packet Inspection (DPI), and to perform data packet flow classification based on the inspection. In this way, the data packet flow 110 may be classified according to PCC rules defined by the PCRF 202 and, e.g., a certain service identifier 103 may be determined. The PCEF 207 being configured for inspection of the data packet flow 110 may sometimes be referred to as having Advanced Detection Capabilities (ADC). PCC rules which control the inspection and classification of the data packet flow 110 can also be referred to more specifically as Application Detection and Control (ADC) rules. The ADC rules can be signaled via the Gx interface.

For example, the PCEF 207 can be co-located within an access gateway, such as a gateway GPRS support note (GGSN) within a packet data network gateway (PDN-GB), or within any other network known which is forwarding data packets of the data packet flow 110, e.g., to/from a UE within the context of an Internet Protocol (IP)-connectivity access network session related to said UE.

The TDF 206 may—alternatively or additionally to the PCEF 207—support data packet inspection and classification of the data packet flow 110, e.g., by performing DPI. The TDF 206 can determine the at least one identifier 101-105 and can signal the latter to the PCRF 202 via the Sd interface. The PCRF 202 can then control the provision of appropriate network resources for this service, e.g., by installing or configuring corresponding PCC rules in the PCEF 207. The TDF 206 can be implemented as a standalone node or can be integrated in another network node, e.g., in a gateway such as a serving gateway node (SGW). The TDF 206 can be co-located with the PCEF 207. The TDF 206 can receive the ADC rules form the PCRF 202 via the Sd interface.

In the light of the above, the PCRF 202 may also be referred to as a policy decision point (PDP), while the PCEF 207, possibly in combination with the TDF 206, may also be referred to as a policy enforcing point (PEP). In general, the PDP may be part of a control plane while the PEP may be part of a data plane of the communications network. The PCEF 207 may be responsible for enforcing policies with respect to authentication of subscribers, authorization to access and services, forwarding of data packets, and accounting and mobility. The PCRF 202 may be responsible for managing individual policies defining network, application, and subscriber conditions that must be met in order to successfully deliver a service or maintain the QoS of a given service.

The repository 201, which may be a standalone database or integrated into an existing subscriber database such as a Home Subscriber Server (HSS), may include information such as entitlements, rate plans, etc. The repository 201 may provide subscription data such as a subscriber's allowed services, a pre-emption priority for each allowed service, information on a subscriber's QoS parameters, e.g., a subscribed guaranteed bandwidth QoS, a subscriber's charging related information, e.g., location information relevant for charging, a subscriber category, e.g., whether the subscriber is a gold user to be provided with a high QoS or a silver or bronze user to be provided with lower QoS. Such information may be used by the PCRF 202 to control the applying of a policy.

The AF 203 is an element offering one or more applications in which a service can be delivered in a network layer which is different from a network layer in which the service was requested. The PCRF 202 can interact with the AF 203 that intervenes in the provision of a service to a user, e.g., as initiator, terminator, or mediator in the service.

As an effect, the PCC architecture as discussed above with respect to FIG. 2 allows to apply policies with respect to the data packet flow 110 which relate to a service originated or terminated by a UE. This application of policies can take into account the specific service invoked or terminated by the UE and alternatively or additionally, the profile data corresponding to the subscriber identified by said UE. In general, the application of policies can be based on the at least one identifier 101-105. The application of policies can further be based on the confidence degree with which the at least one identifier 101-105 is determined.

In FIG. 3, the PCRF 202, the TDF 206, and PCEF 207 are shown in greater detail. The PCRF 202 comprises a processor 202a which is labeled Central Processing Unit (CPU) in FIG. 3. For example, the processor 202a can be a multicore processor. Various tasks may be assigned to the processor 202a, including, but not limited to: network control including setting of PCC rules, in particular of ADC rules, evaluating of the at least one identifier 101-105, evaluating of the corresponding confidence level value. Further, the PCRF 202 comprises an interface 202b (labeled IF in FIG. 3) which is in communication with an interface 206b-1 of the TDF 206, e.g., via the Sd and/or the Gx protocol (cf. FIG. 2). The TDF 206 comprises a processor 206a, likewise labeled as CPU. The processor 206a can be a multi-core processor. Various tasks may be assigned to the processor 206a, including, but not limited to: inspecting of data packets of the data packet flow 110, determining of the at least one identifier 101-105, determining of the corresponding confidence level value, implementing policies, etc. Further, the TDF 206 comprises two interfaces 206b-2, 206b3 which receive and forward data packets 115 (labeled DP in FIG. 3) of the data packet flow 110 between the originator 301 and the recipient 302.

The processor 206a is configured to inspect the data packets 115 of the data packet flow 110. This inspecting of a data packet 115 is illustrated schematically in FIG. 4. The inspecting yields a characteristic property of the data packet flow 110 based on which one or more of the identifiers 101-105 (see FIG. 1) can be determined. In general, the inspecting may be implemented according to various scenarios and techniques. In the example of FIG. 4, the inspecting of the data packet 115 includes inspecting bits 116 of a content of the data packet 115, e.g., of the payload of the data packet 115 and/or of the header of the data packet 115. In such a scenario, the characteristic property may be a sequence of bits. The sequence of bits may be seen as a characteristic fingerprint of the data packet 115 and, likewise, of the data packet flow 110. In general, also the characteristic property of the data packet flow 110 may vary for different implementations of the inspecting. In general, bits 116 can be inspected which are contained in a plurality of consecutive or non-consecutive data packets 115. If the number of inspected bits 116 is increased over time as more and more data packets 115 are considered, this may be referred to as a progressive classification.

For example, the flow identifier 105 can be determined based on the characteristic property relating to the IP 5 tuple of the data packet. The IP 5 tuple comprises the network address (IP address) of the originator of the data packet 115, the network address (IP address) of the recipient 302 of the data packet 115, the transport address of the originator 301 of the data packet 115, the transport address of the recipient 302, and the protocol being used above the network access protocol. For example, the transport addresses can relate to TCP port numbers. For example, the protocol being used above the network access protocol can relate to TCP, UDP, or Stream Control Transmission Protocol (SCTP), etc. For example, the inspecting of the data packet 115 yielding the IP 5 tuple is sometimes referred to as Shallow Packet Inspection (SPI). This can be motivated by a respective information, i.e., the IP 5 tuple, being available early in the data packet flow 110 and at predefined nodes, e.g., by nodes implementing the PCEF 207 which comprise some application detection capabilities such as the ADF, and/or by nodes which implement the TDF 206 which implements the SPI functionality. E.g., the confidence degree with which the IP 5 tuple is typically determined can be comparably high. Therefore, the flow identifier 105 can be determined with a comparably high trustworthiness which is why the corresponding confidence level value may specify a comparably high confidence degree.

Next, techniques of the inspecting which enable to determine the service identifier 103 are described. For example, the inspecting 116 can employ a DPI technique. Sometimes, the DPI technique is also referred to a Heuristic Packet Inspection (HPI). For example, significant sections of content of the data packet 115 of the data packet flow 110 can be inspected to yield the characteristic property of the data packet flow 110. One possible type of the inspection technique is the so-called binary pattern matching, e.g., if a certain binary pattern is found, a match is generated and the preconfigured service identifier 103 for this match is assigned to the data packet flow 110. In other words, the characteristic property of the data packet flow 110 can correspond to a bit pattern of a payload and/or header of the inspected data packets 115.

A further type of the inspection technique relies on inspection of an upload rate and a downlink rate of the data packet flow 110 and, e.g., determination of a ratio thereof. For example, a downlink Real-Time Traffic Protocol (RTP) data packet flow 110 at 64 kilobits per second with a simultaneous uplink RTP data packet flow 110 also at 64 kilobits per second can allow to determine the service identifier 103 such that it classifies the data packet flow 110 as Voice-over-IP traffic.

A further type of the inspection technique relies on a matching between a Domain Name System (DNS) response with a HTTP request. For example, if the DNS response specifies the domain "sampledomain.tv" to belong to the IP address 101.102.103.104 and a subsequent HTTP request to the IP address 101.102.103.104 is captured which contains the URL "www.sampledomain.tv", the service identifier 103 can be determined such that it classifies the data packet flow 110 to relate to the service "sampledomain.tv".

Of course, other techniques of DPI than those which are mentioned above may be applied. Further, two or more inspection techniques can be combined, e.g., by applying them subsequently.

Above, techniques have been predominantly discussed which relate to the inspecting of the data packets 115 and the data packet flow 110 to yield a characteristic property of the data packet flow 110 based on which it is possible to determine at least one identifier 101-105 for the data packet flow 110. Turning to FIG. 5, the confidence degree 500 and the corresponding confidence level value of the at least one identifier 101-105 are determined based on the characteristic properties. The confidence level value specifies the confidence degree 500 with which the at least one identifier 101-105 is determined. In other words, the determining of the confidence level value can occur before, at the same time, or after the determining of the at least one identifier 101-105. The confidence degree 500 expresses the quality of the mechanism of determining the at least one identifier 101-105, e.g., a certainty with which the at least one identifier 101-105 correctly classifies the data packet flow 110.

In FIG. 5, the confidence degree 500 is plotted as a function of a number of inspected data packets 115. As can be seen, if a large (smaller) number of data packets 115 are inspected, the confidence degree 500 increases (decreases).

In FIG. 6, the confidence degree 500 is shown for various types of inspection techniques 610 used for the inspecting of the at least one data packet 115 (see FIG. 4). As can be seen, different types of inspection techniques can be associated with higher or lower confidence degrees 500. For example, in the above-mentioned example where the upload rate and the download rate of the data packet flow 110 are compared, ambiguities may exist between various applications. For example, different applications may rely on the same upload rate and download rate as the above-mentioned example of Voice-over-IP application. In such a case, a certain uncertainty may exist, i.e., a low confidence degree 500 may result. Further, based on the upload rate and the download rate, the level of detail with which the service identifier 103 can be determined may be limited; e.g., if the service identifier 103 is determined such that it classifies the data packet flow 110 to relate to a RTP traffic, it may not be possible to further distinguish whether the RTP traffic relates to an encrypted tunnel transmission, custom traffic, video traffic, or voice traffic. Also such scenarios may result in the confidence level value of the respective inspection technique to specify a comparably small confidence degree 500.

For example, the highest confidence degree 500 can be determined in those cases, where a DPI technique 610 is relied upon, which matches the HTTP request with a URL pertaining to a particular service and which is aimed at a particular recipient 302 which is known to belong to the particular service. If only the URL is known, a lower confidence degree 500 can be determined. Even lower confidence degrees 500 can be determined if a DPI technique as mentioned above which matches binary patterns of given lengths is employed. For example, if the binary pattern relates to a bit sequence 116 of more than eight bits, a comparatively higher confidence degree can be specified than if the bit pattern 116 comprises only two bits. The lowest confidence degree 500 can be specified if a DPI technique 610 is relied upon which determines the service identifier 103 solely upload rates and download rates. Various other scenarios are possible, both qualitatively and quantitatively.

In FIG. 7, the confidence degree 500 is plotted as a function of time. E.g., the confidence degree 500 can be determined at a given point in time and increasing times in FIG. 7 can relate to longer times having elapsed since the given point in time. As can be seen, for increasing elapsed times since the last determination of the corresponding identifier 101-105, the confidence degree 500 can decrease. This is due to the scenario where the characteristic properties of the data packet flow 110 show a time dependency. In such a scenario, it may be desirable to re-execute the inspection of the data packets 115 of the data packet flow 110 and further to re-execute the determining of the identifier 101-105 and the confidence degree 500 from time to time; e.g., when a confidence level value 501 was determined in respect to an identifier of a flow 110 some time ago.

It should be understood that the dependencies of the confidence degree 500 illustrated in the FIGS. 5, 6, and 7 are merely illustrative. Different qualitative and/or quantitative dependencies of the confidence degree 500 on the various parameters may exist and be relied upon. Also, further dependencies of the confidence degree 500 on other parameters not discussed with respect to the FIGS. 5, 6, and 7 may apply. For example, with respect to the above mentioned inspection technique which matches a binary pattern 116 found in the content of a particular data packet 115: it is possible that smaller (larger) confidence degrees 500 are determined for the inspected bits 116 having a smaller (larger) significance. For example, if a larger number of inspected bits 116 are considered, the significance of the inspected bits 116 may be larger. In other words, longer binary patterns of inspected bits 116 can produce a higher certainty in the match and shorter binary patterns of inspected bits 116 can decrease the certainty in the match. For example, if the inspected bits 116 have a comparably unique pattern, the significance may be larger. Further, bit patterns of limited significance can result in ambiguities; in other words, it can happen that the bit patterns of inspected bits 116 are not exclusive such that a low confidence degree 500 is obtained.

By the techniques mentioned above, it is possible to determine the identifier 101-105 and the confidence degree 500. It is possible to selectively signal at least one of the determined identifier 101-105 and/or the corresponding confidence level value 501 which specifies the confidence degree 500, e.g., as part of a single message 800 as shown in FIG. 8. In the scenario of FIG. 8, the service identifier 103 is signaled together with the confidence level value 501 as part of the message 800. Alternatively or additionally it would be for example possible to further include other identifiers 101-105, e.g. the flow identifier 105. For example, the other identifiers 101-105 do not necessarily need to have an associated confidence level value 501 included in the message 800. For example, the message 800 can be sent from the TDF 206 or the PCEF 207 to PCRF 202 (see FIG. 3).

In FIG. 8, the confidence level value 501 has a value of 98. The confidence level value 501 may be expressed in a form that can be compared. In a simple scenario, the confidence level value 501 may be set to true or false, where true indicates a high confidence degree 500 and false indicates a low confidence degree 500. For example, the confidence level value 501 can be expressed as an eight-bit integer, with lower (higher) values expressing higher (lower) certainty in the determination of the corresponding identifier 101-105, i.e., confidence degrees 500: a value of 0 (255) can express the highest (lowest) confidence degree 500. It is possible to signal the confidence level value 501 to other entities of the communications network. For example, in the PCC architectures (see FIG. 2), the confidence level value 501 can be sent for further use to, e.g.: the PCRF 202, the PCEF 207, and/or the OCS 204. In case the TDF 206 is co-located with the PCEF 207, it is possible that the confidence level value 501 is signaled by employing internal mechanisms of the co-located TDF 206 and the PCEF 207.

In case an external and standardized interface is used, e.g., the Gx interface according to the 3GPP TSs between the PCEF 207 and the PCRF 202, it is possible to employ a certain format of the message 800. For example, a dedicated attribute value packet (AVP) can be employed. This AVP can be included as an information element within the AVP "flow-description" as standardized in 3GPP TS 29.213 and 3GPP TS 29.212. For example, the AVP corresponding to the confidence level value 501 can be of the type grouped and it can contain the filter to describe the IP flow (flow-description AVP) and the confidence level value 501 in the detection-quality AVP (see FIG. 8). For example, the data type of the AVP corresponding to the confidence level value 501 can be Unsigned8. The syntax can be as follows:

```
Detection-Quality-Flow::= <AVP Header code>
0*1 [ Flow-Description ]
    [ Detection-Quality ]
*   [ AVP ]
```

In FIG. 9 a flowchart of a method according to various embodiments is illustrated. The method starts with step S1. In step S2, the data packet flow 110 is inspected, e.g., by employing one of the DPI techniques or SPI techniques as mentioned above. A bit pattern may be matched; the upload and download rate may be determined; the IP 5 tuple may be evaluated; DNS and HTTP requests and/or responses may be monitored, etc. In general, in step S2, one or more data packets 115 of the data packet flow 110 can be inspected. The inspecting yields a characteristic property of the data packet flow 110 thereby classifying the data packet slow 110.

Next, in step S3, an identifier 101-105 is determined, e.g., the service identifier 103 based on the inspecting of step S2. For this the characteristic property may be analyzed. E.g., if the characteristic property relates to "www.sampledomain.tv" then the service identifier may correspondingly specify this service.

In step S4, the confidence level value 501 which corresponds to the determining of the identifier in step S3 is determined. For example, step S4 may be based on a type of the inspection technique, a number of inspected packets, a significance of inspected bits, e.g., relating to a number of inspected bits, and so forth.

It should be understood, that while in FIG. 9 step S4 is shown to take place after the execution of step S3, different scenarios may apply. For example, it may be possible to determine the confidence level value 501 in step S4 before the identifier 101-105 is determined in step S3. This may be the case because it may expendable to know the particular value of the at least one identifier as part of the execution of step S4.

In step S5 it is checked whether a further identifier 101-105 needs to be determined. If so, steps S3 and S4 are executed anew where the further identifier 101-105 and the corresponding confidence level value 501 are determined. It is also possible to execute step S2 anew, e.g. by performing additional or different inspection techniques. Otherwise, the method commences with step S6.

In step S6, which is optional, a policy is applied based on the identifier 101-105 previously determined in step S3 and the confidence level value 501 previously determined in step S4. The method ends in step S7.

For example, as part of step S6, it is possible that the PCRF 202 commands to charge the data packet flow 110 to a user account associated with the originator 301 and/or the recipient 302. This commanding can be based on the confidence degree 500 specified by the confidence level value 501 obtained from step S4. This command can comprise sending a message via the Sy interface to the OCS 204 (cf. FIG. 2). As a result, the OCS 204 can execute service-based charging. The OCS 204 can be configured to charge time, volume, e.g. bytes, and/or events of a certain service as identified by the service identifier 103. For example, the command to charge can include the exchange of charging information between the PCRF 202 and the OCS 204 via the Gy interface (cf. FIG. 2).

Such charging which takes into account the confidence level value 501 can have various effects. In various reference implementations, all units are charged equally without having the possibility of discerning the certainty with which a particular data packet flow 110 belongs to a certain service. In other words, the PCEF 207 typically reports all units equally to the OCS 204 and the OCS 204 charges all those units to a given rating group. Based on the confidence level value 501, it is possible to make the behavior of both, the PCEF 207 and the OCS 204, dependent on the certainty degree with which the particular data packet flow 110 is known to belong to a given service. Standard session charging with unit reservation (SOUR) and event charging with unit reservation (ECUR) scenarios can be respectively modified to take advantage of the extra knowledge provided by the confidence level value 501.

ECUR and SOUR are charging modes defined in 3GPP TS 32.240. Both ECUR and SOUR allow for the PCEF 207 to reserve units in the OCF 205, with ECUR allowing reservation of events and SOUR of standard units, which can be bytes (volume) and/or seconds (time or duration, respectively). For example, in SOUR, the PCEF 207 allocates standard units from the OCS 204 (standard units for credit in SOUR are bytes for reserving volume and seconds for reserving time/duration) and consumes them by forwarding and/or processing of data packets 115 of a given data packet flow 110 which has an associated service identifier 103 classifying the data packet flow 110 to correspond to data belonging to a certain service.

After having determined the confidence level value 501, the PCEF 207 can be configured to selectively charge units for data packet flows 110 having a corresponding confidence level value 501 which specifies a confidence degree 500 corresponding to a minimum quality of the determining of the service identifier 103. For example, the PDEF 207 can be configured to solely report to the OCS 204, as part of the multiple-services-credit-control (MSCC), AVP units detected with a certain confidence level value 501 specifying a confidence degree 500 which is larger than a predefined threshold. For example, the following logic may be implemented: For data packet flows 110 with confidence level value 591 specifying a confidence degree 500 smaller than a predefined threshold, e.g., equalling 100: include units in MSCC; for data packet flows 110 with the confidence level value 501 specifying a confidence degree 500 larger than or equal to a predefined threshold, e.g., equalling 100: do not include units in MSCC. The above-mentioned predefined threshold can be configured statically or could be downloaded into the PCEF dynamically, e.g., by means of the Gx interface or any other interface suitable for the task. The above-mentioned predefined threshold can also be used to decide on the conditions that trigger a quota allocation or quota report from the PCEF 207 to the OCS 204.

Similarly to the SOUR, the PCEF 207 can solely report events to the OCS 204 in the case ECUR is employed which have been generated from a data packet flow 110 with a minimum confidence degree 500. Both modifications to SOUR and ECUR can rely on a modified MSCC to convey the quality of detection information. The detection-quality-flow AVP described above can be used for that purpose.

Above techniques have been predominantly discussed, which relate to selectively commanding to charge the data packet flow 110 to a user account associated with the originator 301 and/or the recipient 302 based on the confidence degree 500 specified by the confidence level value 501. As part of step S6, it is alternatively or additionally possible that, based on the confidence degree 500, the PCRF 202 selectively commands to report transmission resources used for transmission of data packet flow 110. The transmission resources can rely to a data amount used for the forwarding of the data packet flow 110 in a network node. For example, for data packet flows 110 which have a certain service identifier 103 identifying a certain service, the PCEF 207 can be configured to selectively report only bytes and/or times for those data packet flows 110 which reach a minimum confidence degree 500. As part of this, a threshold comparison between the confidence degree 500 and a predefined threshold can be executed. For example, the threshold can be configured statically or can be downloaded dynamically into the PCEF 207. Using the Gx interface, the PCRF 202 can implement policies in the PCEF 207 to dynamically adjust the threshold based on network condition, thereby altering the way in which volumes are reported over Gx.

In a further scenario, step S6 can include, based on the confidence degree 500, selectively commanding to enforce a maximum bandwidth for the transmission of the data packet flow 110. The maximum bandwidth may be larger or smaller than a network average and/or a default setting. I.e., certain subscribers may have access to a larger maximum bandwidth than others. In other words, to make sure that only data packet flows 110 detected with a minimum confidence degree 500 are subject to, e.g., bandwidth restriction or throttling or preservation policies (resource allocation), the implementation of QoS in the PCEF 207 can be modified to take into account the confidence degree 500 specified by the confidence level value 501. E.g., if a file transfer data packet flow 110 has a confidence level value 501 which specifies a confidence degree 500 which is above (below) a certain predetermined threshold, it is possible to downgrade (upgrade) the QoS to protect network resources. E.g., if the confidence level value 501 specifies a confidence degree 500 which is above a certain threshold, it is possible to apply standard QoS, in order to ensure that no data packet flows 110 are downgraded if there is a significant possibility of having falsely classified the data packet flow 110 as data transfer. In general: similar as in the above-mentioned scenarios of charging and reporting, solely data packet flows 110 reaching a certain confidence degree 500 can be subject to the application of QoS policies.

Figure 10:
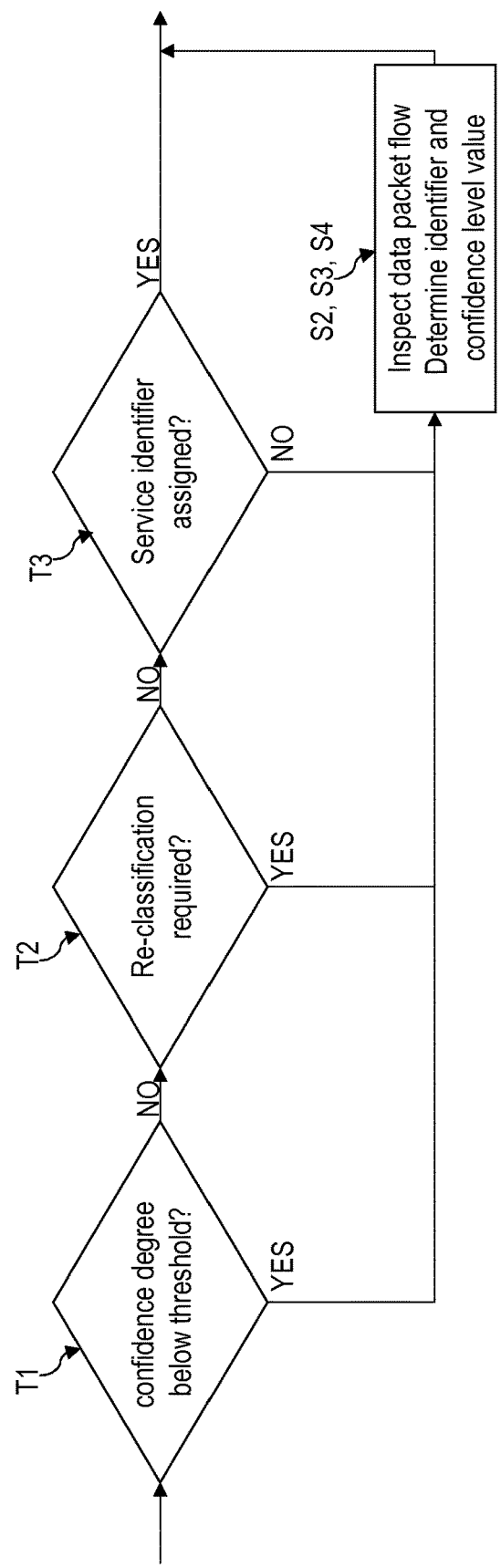
FIG. 10 is a flowchart which illustrates FIG. 9 in greater detail.

Turning to FIG. 9 again, it is possible that, before the inspection of a given data packet 115 or a set of data packets 115 of the data packet flow 110 is executed in step S2, a threshold comparison between previously determined confidence degrees 500 of the data packet flow 110 and a predefined threshold is executed. This is shown in FIG. 10, step T1. Only if it is determined in step T1 that the confidence degree 500 is below the threshold, the steps S2, S3 and S4 are executed. If the confidence degree 500 is not below the threshold, in step T2 it is checked whether reclassification is required for some reason. For example, reclassification may be required if a certain time period has elapsed since the last inspection and classification of the data packet flow 110. As a further example, every HTTP request is evaluated again to compute for URL changes in the same TCP flow. In such a case, steps S2, S3 and S4 are executed, otherwise, it is checked in step T3 whether a service identifier is at all assigned to the data packet flow 110. If this is not the case, steps S2, S3, and S4 are executed, otherwise, the method commences with step S5 in FIG. 9.

In detail, as part of the steps S2, S3, and S4, the inspection techniques SPI and DPI, in particular HPI, can be used to determine the service identifier 103 for the data packet flow 110. For example, steps S2, S3, and S4, and T1-T3 can be executed by the TDF 206. As can be seen from FIG. 10, not all data packets 115 are subject to the inspection as part of step S2. Only those data packets 115 that have no known service identifier 103 (step T3) or that meet specific conditions (step T2). Further, data packets 115 are inspected in step S2 if the corresponding data packet flow 110 has a confidence degree 500 associated with the service identifier 103 which is below the predefined threshold (step T1). This allows for a more accurate and more reliable overall determination of the service identifier 103, as for example, a larger number of bytes can be inspected in the data packet flow 110.

For example, in step T1, a lookup table may be implemented where the flow identifier 105 is associated with the service identifier 103. Respectively, the service identifier 103 can be associated in the lookup table with the confidence level value 500.

In general, it is also possible that the determination of the at least one identifier 101-105 and the determination of the confidence level value 500 occur in a correlated manner. By such techniques, a confidence level value 501 which specifies a confidence degree 500 which is larger than a predefined threshold can be obtained. For example, the TDF 206 can be configured to classify data packet flows 110 by determining a certain service identifier 103 only if the inspection occurs with a minimum confidence degree. For example, throughout the execution of steps S2, S3, and S4 (cf. FIG. 9), the TDF 206 can repeatedly check whether the confidence degree 500 is above a threshold; once the confidence degree 500 reaches the threshold, the TDF 206 may distribute the corresponding at least one identifier 101-105, e.g., the PCRF 202 and/or the PCEF 207. For example, for certain use cases which require a comparably accurate determination of the service identifier 103, the TDF 206 can be configured to determine the service identifier 103 with an ensured minimum confidence degree. In other words, no packet flows 110 below that minimum confidence degree will be included as part of the particular service identified by the respective service identifier 103. For example, data packet flows 110 not reaching the minimum confidence degree will be left unclassified.

Other use cases that require less accurate determining of the service identifier 103, but for instance are less well suited to allow unclassified traffic, can lower the confidence degree requirements on the packet flows 110 and match all flows into the particular service, regardless of the quality of the determining.

Figure 11:
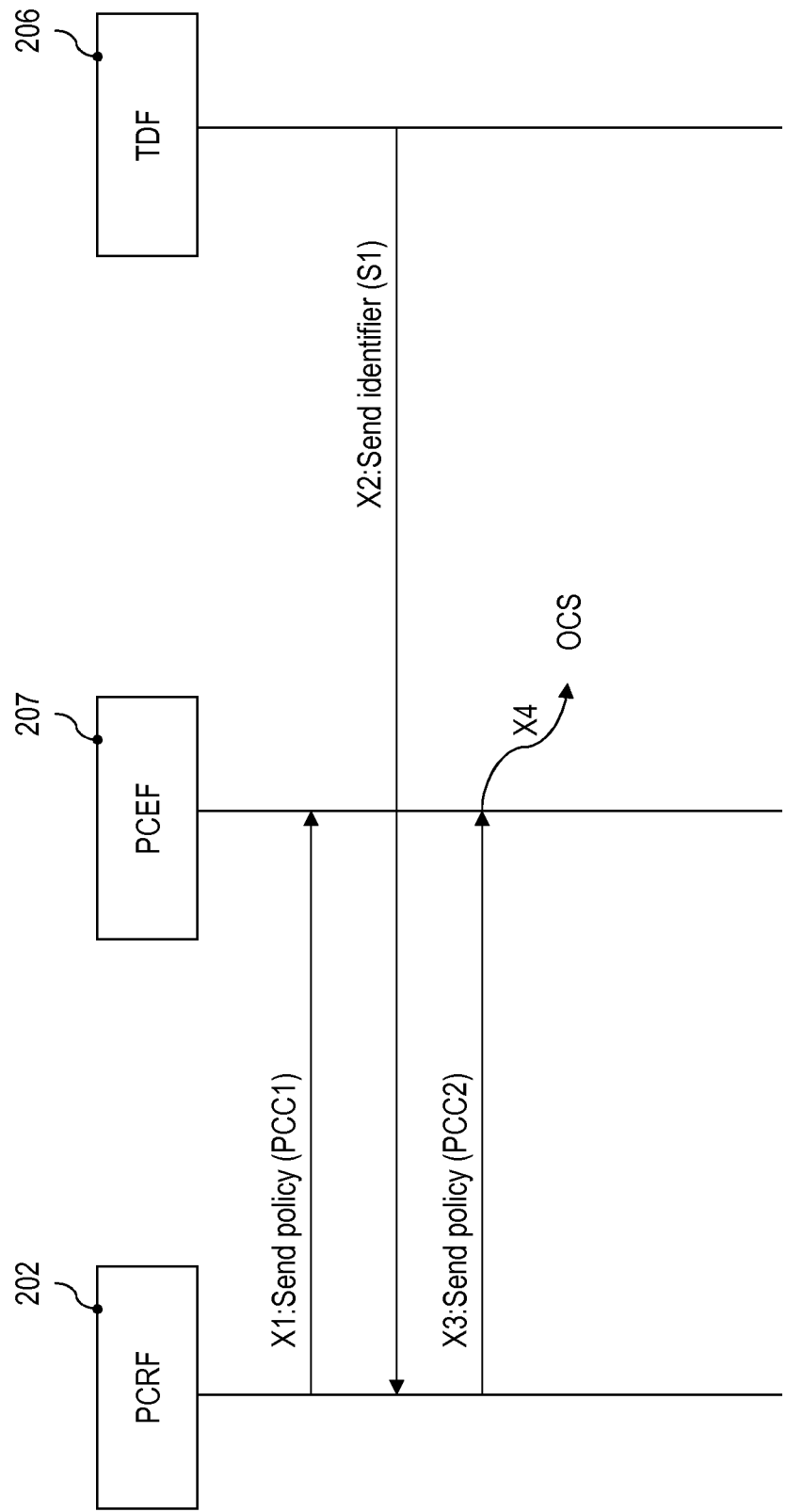
FIG. 11 is a signaling diagram which illustrates the application of a policy according to various embodiments.
Figure 12:
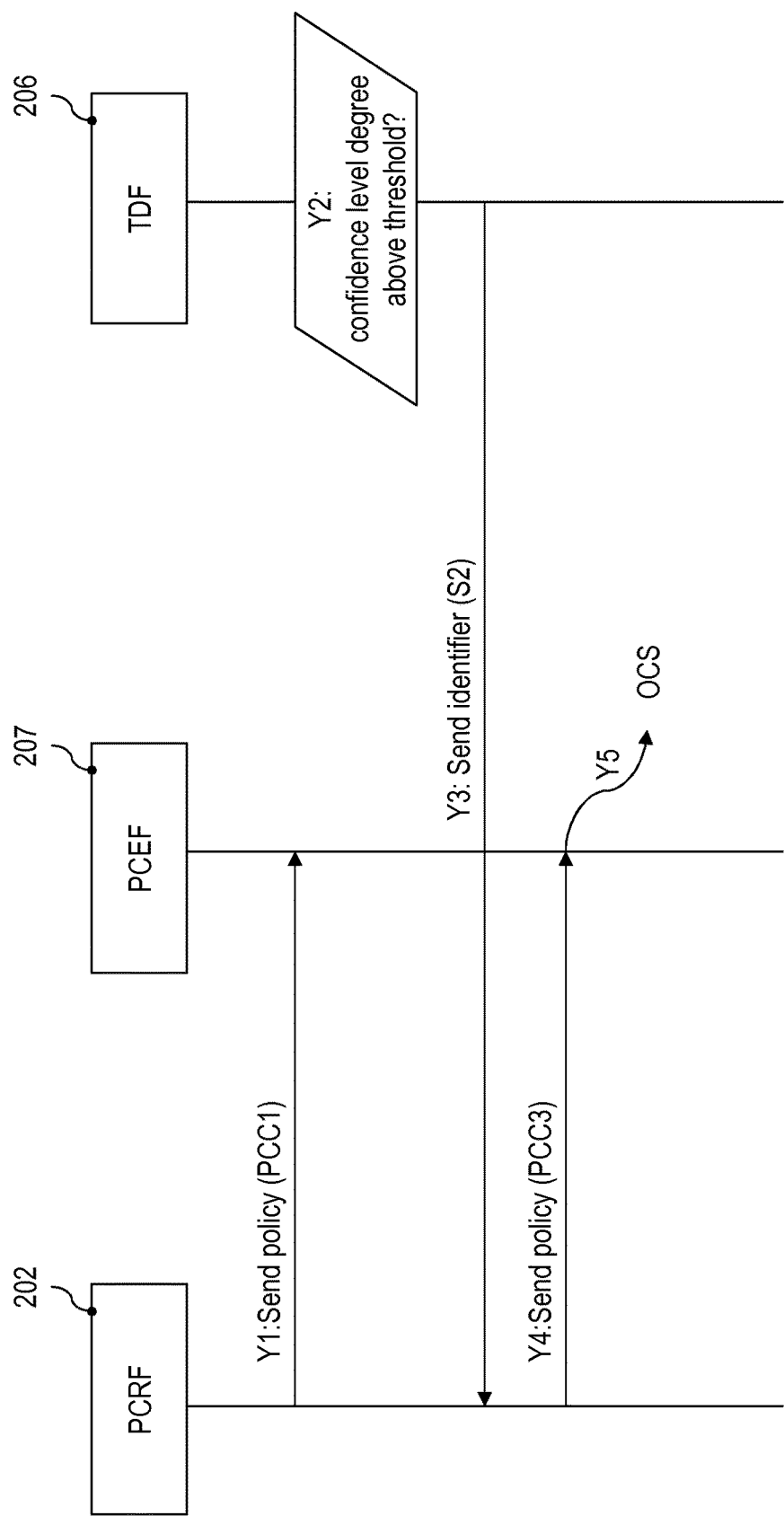
FIG. 12 is a signaling diagram which illustrates the application of a policy according to various embodiments.
Figure 13:
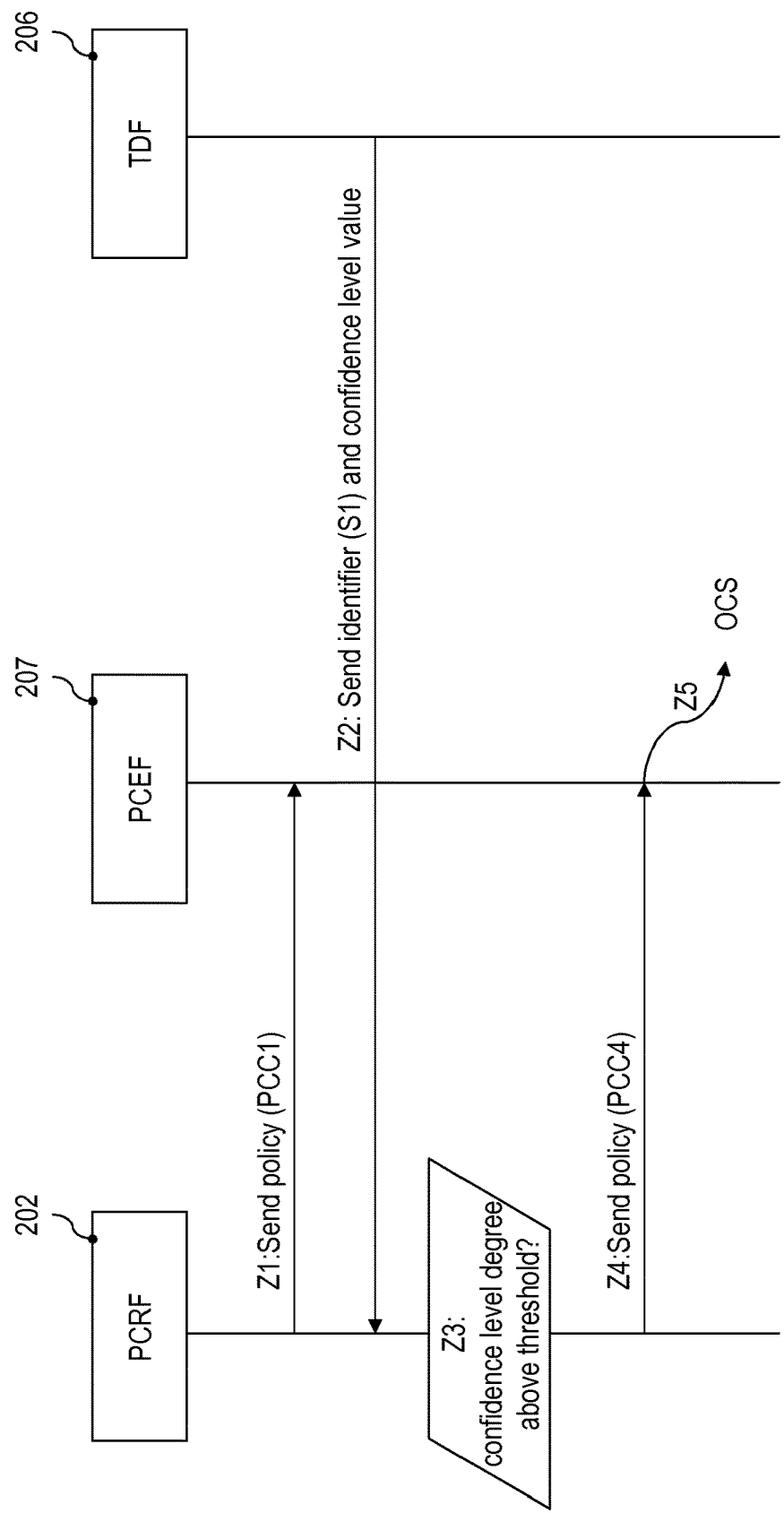
FIG. 13 is a signaling diagram which illustrates the application of a policy according to various embodiments.

The FIGS. 11-13 represent three scenarios where the behavior of the PCEF 207 is modified according to various embodiments with respect to charging functionality. Similar techniques as described below with respect to FIGS. 11-13 in the context of charging can be readily applied to other use cases such as reporting of transmission resources and enforcement of a maximum bandwidth and implementing of forwarding restrictions. For example, the PCEF 207 in FIGS. 11-13 can be a stand-alone unit, in particular if it employs ADC; it can also be co-located entity with the TDF 206.

In step X1 in FIG. 11, the PCRF installs a PCC rule called PCC1 in the PCEF 207. This enables or disables the detection of a certain service S1. The TDF 206 detects the service S1 and reports it to the PCRF 202 in step X2. The PCRF 202 reacts to the notification with the new PCC rule labeled PCC2 in step X3. The new PCC rule PCC2 may be chosen as a function of the reported service S1. In step X4, the PCEF 207 reports consume units towards the OCS 204 (not shown in FIG. 11) as a result of the detection of the service S1 and based on the PCC2 policy.

Turning to FIG. 12: With the availability of the confidence level value 500, the TDF 206 can make an internal decision in step Y2 to report service S2—different from service S1 of FIG. 11—to the PCRF 202 in step Y3. Because in step Y3, the service S2 is reported, in step Y4, the PCRF 202 installs the policy PCC3 in the PCEF 207. This results in a different charging towards the OCS in step Y5: e.g., the service S1 can be charged and the service S2 can be excluded from charging, or both, services S1 and S2 can be charged, but different units or with a different amount of the same units etc.

Turning FIG. 13, it is also possible that the TDF 206 reports the detected service by sending the service identifier 103 as well as the confidence level value 500 as shown in FIG. 13, step Z2. This can be relied upon by the PCRF 202 to choose a policy PCC4 as a function of the reported service as one and the reported confidence level value 500. For example, this decision-finding in the PCRF 202 may rely on a threshold comparison as indicated by step Z3 in FIG. 13. However, other decision-finding situations are possible. The PCC rule is then implemented in the PCEF 207 in step Z4, which enables to charge to the OCS in step Z5.

A scenario not shown in FIGS. 11-13, but as well possible is that the OCS 204 is configured to implement different charging policies based on the confidence level value 500. Here it may be possible to provide the confidence level value 500 to the OCS 204, e.g., the PCEF 207 or the TDF 206 may signal the confidence level value 500 via the Gy interface (cf. FIG. 2). Similar techniques as described above with regard to the PCEF 207 can be readily implemented in the OCS 204.

In general, the functionality and logic as mentioned above may be implemented in the PCEF 207, the TDF 206, the PCRF 202, or the OCS 204. Depending on where the functionality and logic is implemented, there may be a need of signaling more or less information via the respective interfaces Sd, Gx, Gy, and Sy.

As will be appreciated, techniques have been described above which allow to determine the confidence level value 500 for the at least one identifier 101-105 which classifies the data packet flow 110. The confidence level value 500 specifies the confidence degree with which the at least one identifier 101-105 is determined, i.e., relates to a trustworthiness of the at least one identifier 101-105. Further, various use cases have been shown which allow to implement charging, reporting of transmission resources and/or enforcing of a maximum bandwidth in dependence of the confidence level value 500. In this regard, it has been shown that such functionality may be implemented in the TDF 206, the PCEF 207, the PCRF 202, and/or the OCS 204. In various cases, the functionality of the PCEF 207 and the TDF 206 may be implemented as a single entity.

By such techniques, various effects may be obtained. For example, re-evaluation of data packet flows 110 with a poor detection quality, i.e., a low confidence degree 500, allows for better and more accurate detection; this re-evaluation may be a result of the step T1 in FIG. 10. At the same time, computational efforts in the TDF 206 or the PCEF 207 are not unduly occupied because such a re-evaluation is selectively executed for the cases of low confidence degrees 500. Further, by re-evaluation, an overall larger portion of the data packet flow 110 can be inspected such that the basis for the determination of the at least one identifier 101-105 becomes larger and thereby, the confidence degree 500 becomes higher. In other words and more general, the confidence degree 500 can be used as an abort criterion for the inspection of the data packet flow 110. A further effect is that the possibility of re-inspection of data packet flow 110 allows the TDF 206 and/or the PCEF 207 stop determining the at least one identifier 101-105 earlier and/or at a lower confidence degree 500. By techniques of subsequent re-inspection, the initial results can be adapted in an iterative process such that as an effect the at least one identifier 101-105 is eventually determined with a high confidence degree 500. In other words, the determining of the at least one identifier 101-105 is not a final decision, but can be amended in the future.

Furthermore, the above-mentioned techniques allow for a better performance. As the confidence degree 500 can be used as an abort criterion for the inspection and the determination of the at least one identifier 101-105, once a sufficient confidence degree 500 has been reached, no further packets need to be inspected thereby releasing resources.

In various reference implementations, the abort criterion for the inspection and the determination of the at least one identifier 101-105 is typically having inspected a predefined number of data packets. However, such techniques are comparably inefficient, because the predefined number is often selected comparably large to reliably cover worst case scenarios. In the scenarios according to various embodiments as discussed above, progressive and iterative inspection and determination of the at least one identifier 101-105 taking into account the corresponding confidence degree 500 allows for a more flexible abort condition and thereby to tailor the number of data packets 115 which are inspected. This results in a faster, yet very reliable determination of the at least one identifier 101-105.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while various functionalities have been described with respect to the TDF or the PCEF, it should be understood that in general similar functionality can be implemented in the respective other unit. Likewise, processing of the determined confidence level value can occur in the TDF, PCEF, PCRF and OCS; in this respect, the techniques mentioned above can be readily applied to other units. Further, while some scenarios have been discussed primarily with respect to the service identifier, similar techniques may be readily applied to other identifiers, e.g. identifiers which classify the data packet flow with respect to a different characteristics property. Further, while various aspects have been explained with respect to the 3GPP PCC architecture, it should be understood that in general similar techniques may be employed to other architectures of the communications network.

The invention claimed is:

1. A method of classifying a data packet flow between an originator and a recipient in a communications network, the method comprising:
inspecting at least one data packet of the data packet flow to yield a characteristic property of the data packet flow;
determining at least one identifier for the data packet flow based on the characteristic property, the at least one identifier classifying the data packet flow;

determining a confidence level value of the at least one identifier, the confidence level value specifying a confidence degree with which the at least one identifier is determined, the confidence degree expressing a quality of a mechanism used to determine the at least one identifier; and before the inspecting, executing a threshold comparison between the confidence degree specified by a previously determined confidence level value of the data packet flow and a predefined threshold, the inspecting being selectively executed in dependence of an outcome of the threshold comparison, and the inspecting employing a deep packet inspection technique, the deep packet inspection technique yielding the characteristic property of the data packet flow which is selected from group comprising:

an upload rate and a download rate of the data packet flow;

a match between a Domain Name System (DNS) response with a Hypertext Transfer Protocol (HTTP) request, the DNS response and the HTTP request corresponding to the data packet flow; and a bit pattern of a payload of inspected data packets.

2. The method of claim 1, wherein the determining of the confidence level value is based on a number of inspected data packets of the data packet flow.

3. The method of claim 1, wherein the determining of the confidence level value is based on a significance of inspected bits of a content of inspected data packets of the data packet flow.

4. The method of claim 1, wherein:
the determining of the confidence level value being based on a type of the deep packet inspection technique.

5. The method of claim 1, further comprising:
based on the confidence level value, selectively signaling at least one of the at least one identifier and the confidence level value to a network entity to enable applying of a policy to the data packet flow.

6. The method of claim 5, wherein the network entity is one of a policy control entity, a policy enforcement entity and a charging entity.

7. The method of claim 1, wherein the at least one identifier classifies a service for which a content of data packets of the data packet flow comprises data.

8. The method of claim 1, wherein the determining of the at least one identifier and the determining of the confidence level value occurs in a correlated manner, whereby the confidence level value which specifies the confidence degree which is larger than the predefined threshold is obtained.

9. The method of claim 1, further comprising:
at least based on the confidence level value, applying a policy to the data packet flow.

10. The method of claim 9, wherein the applying of the policy comprises:
based on the confidence degree specified by the confidence level value, selectively commanding to charge the data packet flow to a user account associated with at least one of the originator and the recipient.

11. The method of claim 9, wherein the applying of the policy comprises:
based on the confidence degree specified by the confidence level value, selectively commanding to report transmission resources used for transmission of the data packet flow.

12. The method of claim 9, wherein the applying of the policy comprises:

based on the confidence degree specified by the confidence level value, selectively commanding to enforce a maximum bandwidth for transmission of the data packet flow.

13. The method of claim 9, wherein the policy is at least one of a quality of service policy and a charging policy.

14. A method of applying a policy to a data packet flow between an originator and a recipient in a communications network, the method comprising:

receiving at least one identifier for the data packet flow which classifies the data packet flow based a characteristic property yielded from an inspection of at least one data packet of the data packet flow, the inspecting employing a deep packet inspection technique, the deep packet inspection technique yielding the characteristic property of the data packet flow which is selected from group comprising:

an upload rate and a download rate of the data packet flow;

a match between a Domain Name System (DNS) response with a Hypertext Transfer Protocol (HTTP) request, the DNS response and the HTTP request corresponding to the data packet flow; and a bit pattern of a payload of inspected data packets;

receiving a confidence level value of the at least one identifier, the confidence level value specifying a confidence degree with which the at least one identifier is determined, the confidence degree expressing a quality of a mechanism used to determine the at least one identifier; and applying a policy to the data packet flow if at least the confidence level value exceeds a threshold.

15. The method of claim 14, wherein the applying of the policy comprises:
based on the confidence degree specified by the confidence level value, selectively commanding to charge the data packet flow to a user account associated with at least one of the originator and the recipient.

16. The method of claim 14, wherein the applying of the policy comprises:
based on the confidence degree specified by the confidence level value, selectively commanding to report transmission resources used for transmission of the data packet flow.

17. The method of claim 14, wherein the applying of the policy comprises:
based on the confidence degree specified by the confidence level value, selectively commanding to enforce a maximum bandwidth for transmission of the data packet flow.

18. The method of claim 14, wherein the policy is at least one of a quality of service policy and a charging policy.

19. A network entity configured to classify a data packet flow between an originator and a recipient in a communications network, the network entity comprising:
an interface configured to receive at least one data packet of a data packet flow;
a processor configured to:
inspect the at least one data packet to yield a characteristic property of the data packet flow;
determine at least one identifier for the data packet flow based on the characteristic property, the at least one identifier classifying the data packet flow;
determine a confidence level value of the at least one identifier, the confidence level value specifying a confidence degree with which the at least one identifier is determined, the confidence degree expressing a quality of a mechanism used to determine the at least one identifier; and execute, before the inspecting, a threshold comparison between the confidence degree specified by a previously determined confidence level value of the data packet flow and a predefined threshold, the inspecting being selectively executed in dependence of an outcome of the threshold comparison, and the inspecting employing a deep packet inspection technique, the deep packet inspection technique yielding the characteristic property of the data packet flow which is selected from group comprising:

an upload rate and a download rate of the data packet flow;

a match between a Domain Name System (DNS) response with a Hypertext Transfer Protocol (HTTP) request, the DNS response and the HTTP request corresponding to the data packet flow; and a bit pattern of a payload of inspected data packets.

20. The network entity of claim 19, wherein the determining of the confidence level value is based on a number of inspected data packets of the data packet flow.

21. The network entity of claim 19, wherein the determining of the confidence level value is based on a significance of inspected bits of a content of inspected data packets of the data packet flow.

22. The network entity of claim 19, wherein the determining of the confidence level value is based on a type of the deep packet inspection technique.

23. The network entity of claim 19, further comprising:
a further interface configured to selectively signal, based on the confidence level value, at least one of the at least one identifier and the confidence level value to a further network entity to enable applying of a policy to the data packet flow.

24. The network entity of claim 23, wherein the network entity is one of a policy control entity, a policy enforcement entity and a charging entity.

25. The network entity of claim 19, wherein the at least one identifier classifies a service for which a content of data packets of the data packet flow comprises data.

26. The network entity of claim 19, wherein the determining of the at least one identifier and the determining of the confidence level value occurs in a correlated manner, whereby the confidence level value which specifies the confidence degree which is larger than a predefined threshold is obtained.

27. The network entity of claim 19, wherein the processor is further configured to apply a policy to the data packet flow, at least based on the confidence level value.

28. The network entity of claim 27, wherein the processor is further configured to execute, as part of the applying of the policy, the following step:
based on the confidence degree specified by the confidence level value, selectively commanding to charge the data packet flow to a user account associated with at least one of the originator and the recipient.

29. The network entity of claim 27, wherein the processor is further configured to execute, as part of the applying of the policy, the following step:
based on the confidence degree specified by the confidence level value, selectively commanding to report transmission resources used for transmission of the data packet flow.

30. The network entity of claim 27, wherein the processor is further configured to execute, as part of the applying of the policy, the following step:
based on the confidence degree specified by the confidence level value, selectively commanding to enforce a maximum bandwidth for transmission of the data packet flow.

31. The network entity of claim 27, wherein the policy is at least one of a quality of service policy and a charging policy.

32. A network entity which is configured to apply a policy to a data packet flow between an originator and a recipient in a communications network, the network entity comprising:
an interface configured to:
receive at least one identifier for the data packet flow which classifies the data packet flow based a characteristic property yielded from an inspection of at least one data packet of the data packet flow, the inspecting employing a deep packet inspection technique, the deep packet inspection technique yielding the characteristic property of the data packet flow which is selected from group comprising:
an upload rate and a download rate of the data packet flow;
a match between a Domain Name System (DNS) response with a Hypertext Transfer Protocol (HTTP) request, the DNS response and the HTTP request corresponding to the data packet flow; and
a bit pattern of a payload of inspected data packets; and
receive a confidence level value of the at least one identifier, the confidence level value specifying a confidence degree with which the at least one identifier is determined, the confidence degree expressing a quality of a mechanism used to determine the at least one identifier; and
at least one processor configured to apply a policy to the data packet flow if at least the confidence level value exceeds a threshold.

33. The network entity of claim 32, wherein the applying of the policy comprises:
based on the confidence degree specified by the confidence level value, selectively commanding to charge the data packet flow to a user account associated with at least one of the originator and the recipient.

34. The network entity of claim 32, wherein the applying of the policy comprises:
based on the confidence degree specified by the confidence level value, selectively commanding to report transmission resources used for transmission of the data packet flow.

35. The network entity of claim 32, wherein the applying of the policy comprises:
based on the confidence degree specified by the confidence level value, selectively commanding to enforce a maximum bandwidth for transmission of the data packet flow.

36. The network entity of claim 32, wherein the policy is at least one of a quality of service policy and a charging policy.

* * * * *